US005365742A

United States Patent [19]

Boffito et al.

[11] Patent Number: 5,365,742

[45] Date of Patent: Nov. 22, 1994

[54] DEVICE AND PROCESS FOR THE REMOVAL OF HYDROGEN FROM A VACUUM ENCLOSURE AT CRYOGENIC TEMPERATURES AND ESPECIALLY HIGH ENERGY PARTICLE ACCELERATORS

[75] Inventors: Claudio Boffito; Bruno Ferrario, both of Milan, Italy

[73] Assignee: SAES Getters S.p.A., Milan, Italy

[21] Appl. No.: 62,333

[22] Filed: May 17, 1993

Related U.S. Application Data

[63] Continuation of Ser. No. 800,434, Nov. 29, 1991.

[30] Foreign Application Priority Data

Jan. 25, 1991 [IT] Italy ............................ MI91A00186

[51] Int. Cl.$^5$ ........................ H01J 7/18; F17C 11/00; B01D 8/00

[52] U.S. Cl. ...................................... 62/46.2; 62/46.1; 62/55.5; 252/181.5; 252/181.6

[58] Field of Search ...................... 62/46.1, 46.2, 55.5; 252/181.5–181.6

[56] References Cited

U.S. PATENT DOCUMENTS

| | | | |
|---|---|---|---|
| 3,620,645 | 11/1971 | della Porta . | |
| 4,433,063 | 2/1984 | Bernstein et al. | 62/46.2 X |
| 4,481,779 | 11/1984 | Barthel | 62/46.3 |
| 4,559,471 | 12/1985 | Kroontje | 252/181.6 X |
| 4,580,404 | 4/1986 | Pez et al. | 62/46.3 X |
| 4,799,360 | 1/1989 | Retallick et al. | 62/46.2 |
| 4,886,240 | 12/1989 | Rich | 62/46.3 X |

FOREIGN PATENT DOCUMENTS

| | | | |
|---|---|---|---|
| 0088881 | 5/1985 | Japan | 62/55.5 |
| 0112900 | 5/1986 | Japan | 62/46.2 |
| 1205382 | 9/1986 | Japan | 62/55.5 |
| 1215470 | 9/1986 | Japan | 62/55.5 |
| 1229979 | 10/1986 | Japan | 62/55.5 |
| 0195499 | 8/1988 | Japan | 62/46.2 |
| 921273 | 8/1960 | United Kingdom . | |

OTHER PUBLICATIONS

Benvenuti et al, Proceedings of the 7th Inat'l Vacuum Congress, Vienna 1977, pp. 85–88.

*Primary Examiner*—Henry A. Bennett
*Assistant Examiner*—Christopher Kilner
*Attorney, Agent, or Firm*—David R. Murphy

[57] ABSTRACT

A device for the removal of hydrogen from a vacuum enclosure at cryogenic temperatures, especially high energy particle accelerators which comprises a metal support preferably in the form of a strip of aluminium and a composition able to sorb hydrogen adherent to the support in particular on at least one surface of the strip. The composition comprises a porous absorber of $H_2O$, preferably powdered aluminium oxide and in contact with palladium oxide which preferably covers, at least partially, the water absorber.

12 Claims, 3 Drawing Sheets

DEVICE AND PROCESS FOR THE REMOVAL OF HYDROGEN FROM A VACUUM ENCLOSURE AT CRYOGENIC TEMPERATURES AND ESPECIALLY HIGH ENERGY PARTICLE ACCELERATORSThis is a continuation of Ser. No. 800,434, filed Nov. 29, 1991.

BACKGROUND TO THE INVENTION

In traditional high energy particle accelerators there has been used a distributed non-evaporable getter (NEG) system for reaching the ultimate vacuum in the system. This consists of coating a metallic non-evaporable getter on one or both surfaces of a supporting strip and then disposing the strip along substantially the whole length of the vacuum chamber constituting the beam tube of the accelerator. See U.S. Pat. No. 3,620,645 and C. Benvenuti and J-C. Decroux, Proceedings of the 7th International Vacuum Congress (Dobrozemsky, Vienna, 1977) p. 85.

Unfortunately there are disadvantages related to the use of non-evaporable getters in that they have to undergo a heating process to make them active and sorb unwanted gases, including hydrogen. Such heating can place an unacceptably high thermal load on the cryogenic cooling systems associated with the accelerator. Furthermore when the NEG is cooled down to the cryogenic temperature its sorption capacity becomes limited to the surface area only of the sorbing material with a consequent reduction of its ability to sorb hydrogen.

In addition as the accelerator reaches higher and higher circulating beam energies synchrotron radiation becomes more important as it tends to stimulate desorption of gas from the inner wall of the beam tube. In accelerators where superconducting magnets are used this gas is essentially hydrogen, with a very small amount of CO.

BRIEF OBJECTS OF THE INVENTION

It is therefore an object of the present invention to provide a device and process for the removal of hydrogen from a vacuum at cryogenic temperatures which is free from one or more of the disadvantages of prior art hydrogen removal systems.

It is another object of the present invention to provide a device and process for the removal of hydrogen from a vacuum at cryogenic temperatures which does not place a thermal load on the cryogenic system of the vacuum chamber.

It is yet another object of the present invention to provide a device and process for the removal of hydrogen from a vacuum at cryogenic temperatures which is not limited by the surface area in its sorption of hydrogen.

It is a further object of the present invention to provide a device and process for the removal of hydrogen from a vacuum at cryogenic temperatures which is capable of sorbing hydrogen desorbed from the walls of a particle accelerator or storage device.

These and other advantages and objects of the present invention will become evident with reference to the following drawings thereof and description wherein:

DETAILED DESCRIPTION OF THE INVENTION

Figure 1:
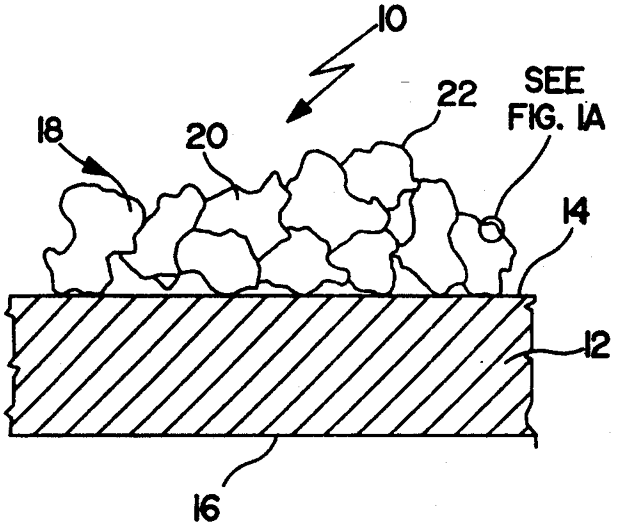
FIG. 1 is a cross-sectional representation of a strip useful in the present invention.
Figure 1A:
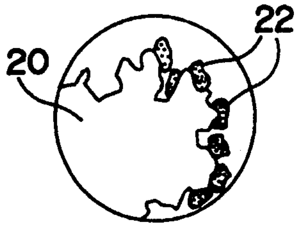
FIG. 1A is an enlarged view of that portion so indicated on FIG. 1.

The present invention provides a device 10 for the removal of hydrogen from a vacuum at cryogenic temperatures. By cryogenic temperatures is meant those temperatures equal to, or below the temperature of boiling oxygen. It comprises a metal support in the form of a metal strip 12 which can be any metal to which aluminum oxide can adhere, but preferably is a metal having a high thermal conductivity such as copper, silver, molybdenum and Nichrome. Aluminium is the preferred metal.

The aluminium strip has a length much greater than its width forming an upper surface 14 and a lower surface 16. The thickness of strip 12 is preferably between 25 μm and 1000 μm and more preferably between 100 μm and 800 μm. At lower thicknesses it becomes too thin to be handled without breaking. At greater thicknesses it becomes excessively bulky and rigid.

A hydrogen sorbing composition of matter 18 adheres the upper surface 14 of strip 12 but could just as well adhere also to lower surface 16. Composition of matter 18 comprises aluminium oxide, or, more in general, porous physical sorbents of moisture in contact with palladium oxide. The aluminium oxide is in the form of a powder 20 and preferably has a particle size of between 5 μm and 80 μm. At lower particle sizes the aluminium oxide becomes dangerous to handle (health hazard) while at larger particle sizes it has a lower surface area per unit mass and is less efficient as a sorber of $H_2O$.

The palladium oxide is preferably in the form of a thin layer 22 covering the aluminium oxide powder 20. The weight ratio of aluminium oxide to palladium oxide is from 99.9:0.1 to 50:50 and preferably is from 99.5:0.5 to 90:10. A higher ratios there is too little palladium oxide to efficiently perform its hydrogen conversion function for a sufficiently long time. At lower ratios the palladium oxide blocks the sorption of $H_2O$ by the aluminium oxide and the additional cost is not offset by proportionally increased sorption. The palladium oxide is present therefore as a multiplicity of clusters or islands on the surface of the aluminium oxide.

Hence, on contacting the composition with hydrogen the palladium oxide, at the cryogenic temperature, is transformed into palladium and $H_2O$, and the $H_2O$ is sorbed directly by the aluminium oxide without going through the vapour phase.

If the $H_2O$ were to be released as vapour it would be able to condense upon the walls of the beam tube only to he released as vapor once again by the synchrotron radiation. This increase in the partial pressure of the $H_2O$ vapour would severely degrade the quality of the circulating particles in the particle accelerator.

It is known from UK patent N° 921,273 to use palladium oxide in combination with an absorber of $H_2O$ such as zeolite, but physically separated therefrom.

Figure 2:
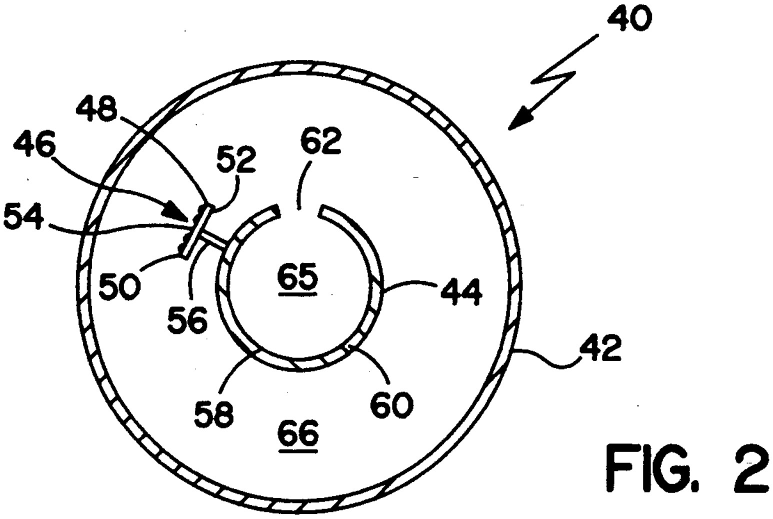
FIG. 2 is a representation of a vacuum enclosure of a high energy particle accelerator incorporating a strip of the present invention.

FIG. 2 shows a vacuum enclosure 40 comprising an outer wall 42 and a beam tube 44 held at cryogenic temperatures, of a high energy particle accelerator. There is a device 46 comprising a metal strip 48 of aluminium having a length much greater than its width. It forms an upper surface 50 and a lower surface 52. The thickness is 40 μm.

A hydrogen sorbing composition of matter 54 is adherent to both surfaces. The composition 54 was produced following Example 3 (below) with the particles of aluminium oxide having an average particle size of between 3 μm and 7 μm. There was 3 mg of aluminium oxide per $cm^2$. Co-deposited as clusters, on the surface of the aluminium oxide was palladium oxide, Its concentration was 0.3 mg/$cm^2$.

Device 46 is held by a rod 56 on to the outside surface 58 of a beam tube 60. Beam tube 60 contains a slit 62 approximately 2 mm wide connecting the beam area 65 with annular outer side chamber 66.

It will be realized that as used in the instant specification and claims the term aluminium oxide embraces hydrated aluminium oxide and all known forms which generally are known as γ-alumina. Other porous physical adsorbents efficient for $H_2O$ sorption are also included. Any technique of applying the composition of the present invention to the metal support can be used. Non-limiting examples are given in the following Table I.

TABLE I

| TECHNIQUE | SUPPORT |
|---|---|
| Electroless plating, co-deposition of Pd + Al O.OH with oxidation | Al |
| Bonding of $Al_2O_3$/PdO particles onto strips | any metal |
| Plasma spray coating with $Al_2O_3$ and then Pd deposition with oxidation | any metal |
| Electrophoretic deposition of $Al_2O_3$ + sintering at 1550° C. or above, then Pd deposition and oxidation | Mo, Ta refractory metals (m.p. >1550° C.) |
| Anodic Oxydation with successive Pd deposition and oxidation | Al |

The invention may be better understood by reference to the following examples wherein all parts and percentages are by weight unless otherwise indicated. These examples are designed to teach those skilled in the art how to practice the present invention and represent the best mode presently known for practicing the invention.

EXAMPLE 1

This example illustrates the preparation of a powder suitable for use in the present invention.

50 g of $Al_2O_3$ (γ-alumina) of maximum particle size 80 μm and having a surface area of 300 $m^2$g, where placed in a glass vessel and degassed, under vacuum, at 120° C. for 40 minutes. After cooling there was added a solution of 2.5 g of Pd in the form of $PdCl_2$ in 40 $cm^3$ water. The solution was again evaporated under vacuum at 45° C. thus depositing $PdCl_2$ over the surface of the $Al_2O_3$.

A quantity of solution of $NaHCO_3$ was added sufficient to turn all the $PdCl_2$ into $Pd(OH)_2$ by the reaction:

$$PdCl_2+2NaHCO_3 \rightarrow Pd(OH)_2+2NaCl+2CO_2.$$

Formaldehyde was then added in sufficient quantity to reduce the $Pd(OH)_2$ to Pd metal. The powder was then rinsed to remove reactants and then dried in an oven at 80° C. for 6 hours and then oxidized in a flow of pure $O_2$ at 350° C., for 3 hours.

EXAMPLE 2

Figure 3:
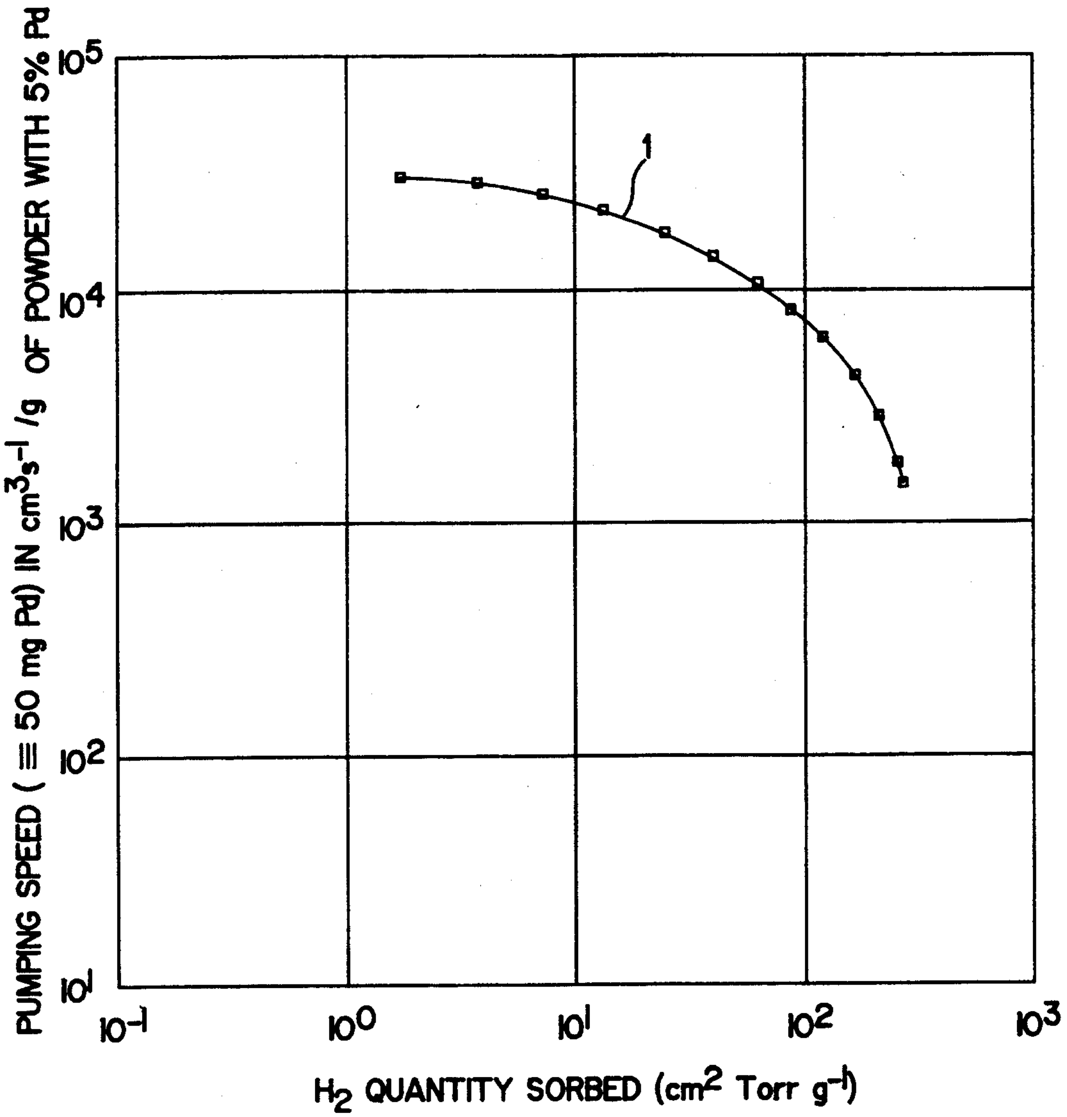
FIG. 3 is a graph showing the sorption properties, for hydrogen, of a powder prepared according to the present invention.

A sample of powder prepared exactly as in Example 1 was placed in a test apparatus designed to measure the sorption characteristics according to ASTM (American Society for Testing and Materials) standard procedure N° F798-82. The test gas used was hydrogen at a pressure of $3\times10^{-6}$ torr ($\times10^{-6}$ mbar). The sample was held at a temperature of −196° C. The test results are shown on FIG. 3 as curve 1.

EXAMPLE 3

A strip of aluminium 30 mm ×0.2 mm ×10 cm was immersed in a solution of $PdCl_2$ where the following reaction took place $$2Al+3PdCl_2 \rightarrow 3Pd+2AlCl_3,$$

The solution was made slightly acid whereupon the following reaction took place $$2AlCl_3+4H_2O \rightarrow 2Al\ O(OH)+6\ HCl$$

resulting in a co-deposition of Pd and hydrated aluminium oxide.

The strip of coated aluminium was washed and rinsed and dried at 80° C. in air and then heated in a flow of pure $O_2$ at 350° C.

EXAMPLE 4

Figure 4:
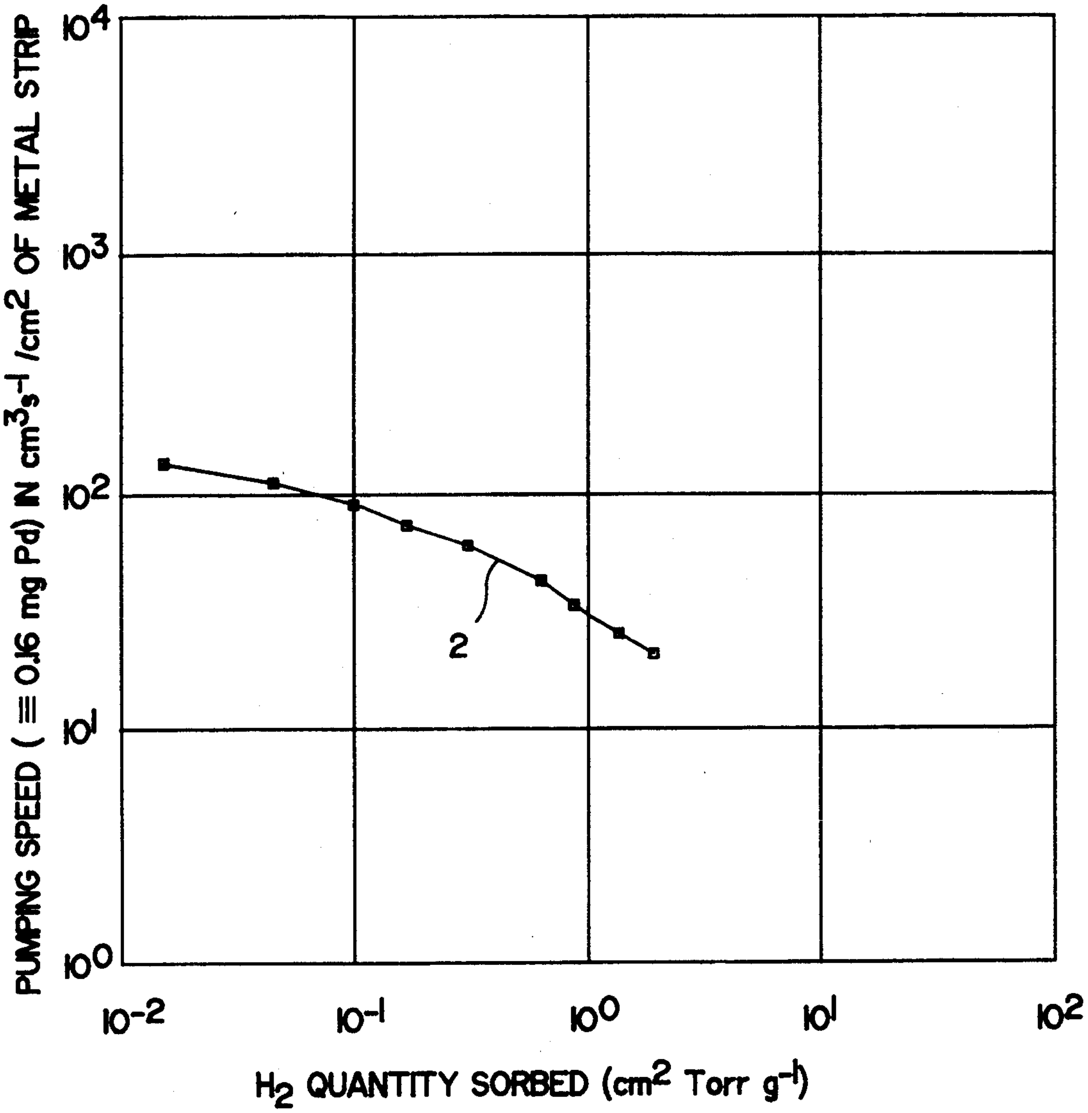
FIG. 4 is a graph showing the sorption properties, for hydrogen, of a strip prepared according to the present invention.

The test of Example 2 was repeated except that a piece of the coated strip prepared as in Example 3 was used. The test results are shown in FIG. 4 as curve 2.

Although the invention has been described in detail with reference to high energy particle accelerators or storage rings it will be realized that it may be applied to any device held at cryogenic temperatures where the pumping of hydrogen is a problem. for instance in Dewars, or anywhere where thermal insulation is required and insulation by liquid nitrogen is provided. Cryogenic fluid transport lines are another example. The hydrogen sorbing composition can be also held directly on structural parts of the device such as its walls.

It could be placed on the baffles of a cryopump for instance.

We claim:

1. A process for sorbing hydrogen-containing gases in order to create a vacuum essentially consisting of the steps of:

I. providing a device comprising:
  A. a metal support; and
  B. a hydrogen sorbing composition of matter adherent to said support said composition comprising:
    i) a porous physical $H_2O$ sorbent; and
    ii) palladium oxide in contact with said porous physical $H_2O$ sorbent; and then II. contacting the hydrogen-containing gasses at cryogenic temperatures with said device.

2. A device for the sorption of hydrogen-containing gases from a vacuum space apparatus working at cryogenic temperature containing a metal strip having a length greater than its width and having an uppermost surface and lowermost surface a means for operating the device at a cryogenic temperature, and furthermore containing a hydrogen sorbing composition adherent to said strip wherein said composition is a binary composition consisting essentially of:

i) a porous physical $H_2O$ sorbing material; and ii) palladium oxide in contact with said $H_2O$ sorbing material under i).

3. The device of claim 2 wherein said $H_2O$ sorbing material is aluminum oxide.

4. The device of claim 2 wherein said composition is adherent to at least one surface of said strip, wherein said $H_2O$ sorbing material is a particulate aluminum oxide, having a particle size from 5 to 100 microns, and wherein said $H_2O$ sorbing material is coated by a layer of palladium oxide.

5. The device of claim 4, operating at a temperature lower than 90K, wherein the weight ratio between said aluminum oxide and said palladium oxide is from 99.9: 0.1 to 50:50 and wherein said metal strip is made from aluminum and shows a thickness from 25 to 1000 microns.

6. The device of claim 5 wherein said palladium oxide layer is replaced by clusters of palladium oxide on the surface of said aluminum oxide.

7. The device of claim 6 wherein said clusters are obtained by bringing said aluminum oxide into contact with the solution of a water soluble palladium salt and by precipitating then palladium oxide by means of an alkaline solution.

8. A process for sorbing hydrogen-containing gases, to create a vacuum in a high energy particle accelerator, essentially consisting of the step of bringing said hydrogen-containing gases, at a cryogenic temperature, into contact with the device of claim 2.

9. A process for sorbing hydrogen-containing gases, in order to create a vacuum essentially consisting of the steps of:

I. providing the device of claim 2;

II. bringing said hydrogen-containing gases, at a cryogenic temperature, into contact with said device under I).

10. The process of claim 8 wherein said cryogenic temperature is equal to or lower than 90K.

11. The process of claim 9 wherein said cryogenic temperature is equal to or lower than 90K.

12. A process for the adsorption of hydrogen-containing gases in order to create a vacuum essentially consisting of the steps of:

I. providing a device comprising:

A. a metal support; and

B. a hydrogen sorbing composition of matter adherent to said support said composition comprising:

i) a porous physical $H_2O$ sorbent; and ii) palladium metal in contact with said porous physical $H_2O$ sorbent; and then II. contacting the hydrogen-containing gases at cryogenic temperatures with said device.

* * * * *